Oct. 25, 1955

R. A. JAHNSEN 2,721,529

ARRANGEMENT IN TANKERS FOR TRANSPORTATION
OF LIQUIDS UNDER PRESSURE

Filed Sept. 24, 1951

Inventor
Ragnar Anton Jahnsen
By
Shenderoth, Lind & Ponack
Attorneys.

2,721,529
Patented Oct. 25, 1955

United States Patent Office 2,721,529

ARRANGEMENT IN TANKERS FOR TRANSPORTATION OF LIQUIDS UNDER PRESSURE

Ragnar Anton Jahnsen, Holmen, Oslo, Norway, assignor to Norsk Hydro-Elektrisk Kvaelstofaktieselskab, Oslo, Norway Application September 24, 1951, Serial No. 247,953

2 Claims. (Cl. 114—74)

The present invention relates to an arrangement in tankers for transportation of liquids under pressure, especially compressed, liquified gases in pressure tanks. With the designation "liquified gases" should here be understood fluids which at atmospheric pressure and normal temperature are gaseous but which are made liquid by compression.

For such purposes is known to use cylindric vertical tanks which are permanently installed on board the ship. In such known arrangements it has further been proposed to connect the separate tanks with common inlet and outlet pipes. It is further known to make central tanks of greater height than those next to the ship's sides. This arrangement of the tanks affords the best utilization of the capacity of the ship and at the same time the most favourable conditions of stability.

A condition for transportation of compressed, liquified gases in pressure tanks is that sufficient volume of expansion is provided for in view of the varying specific volume of the gases with changing temperatures. The tanks should consequently not be filled completely with liquified gas. Finally it is of importance with such pressure tanks to avoid pipe connections and other branches at the bottom of the containers and to place all branches and apertures in the upper portion of the containers so that principally gas and not liquid is escaping in case of leakage or breakage of the pipe-connections.

The arrangement according to the present invention is carried out essentially in accordance with above indicated principles for the construction of such tanks.

One important feature of the invention consists in the fact that the tanks are group wise interconnected, the separate tanks in each group being doubly communicating connected with each other by connections as well between the lower parts of the tanks as by connections between their upper parts, and that each such group of tanks is provided with a common expansion space, common inlet and outlet device and preferably with common control instruments.

Hereby is obtained a simplification of the emptying and filling of the tanks and also of the measuring of pressure and the level of the liquid, each group being operated as a unit.

Preferably one of the tanks of each group is made of greater height than the other tank or tanks of the same group, the upper part of the first mentioned tank serving as a common expansion space for all tanks of the group.

In this case the highest tank is conveniently made or arranged in such a way that the other tank or tanks of each group can be kept completely filled with liquid during transport. By reducing the free surface of the liquid in this way a considerable improvement of the stability of the ship is obtained during rolling.

According to a convenient embodiment of the invention vertical tanks are arranged in three rows extending in the longitudinal direction of the ship, each group comprising one tank from each row. The tanks of the central row are conveniently made higher than the tanks of the side rows, so that last mentioned tanks in the same way as mentioned above can be kept completely filled, the common expansion space being located in the upper part of the central tank.

However, the invention is not limited to this form of execution, as one group may consist of two tanks or more than three tanks.

Some embodiments of the invention will be described more in detail in the following in connection with the drawing, where:

Figure 1:
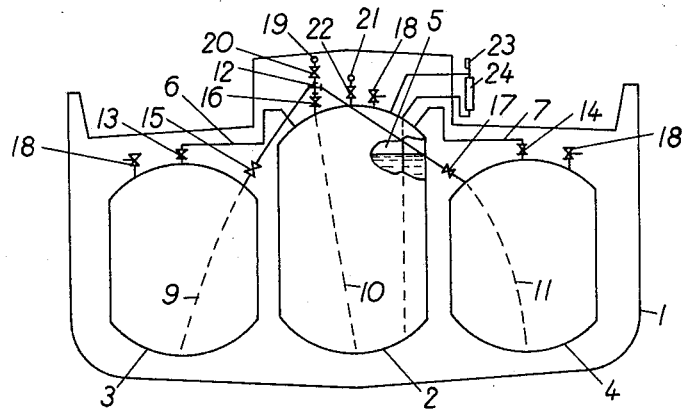
Figure 1 shows a diagrammatic section through a ship provided with a tank arrangement according to one embodiment of the invention.

In Figure 1 the numeral 1 designates the hull of the ship or tanker. 2 is a centrally arranged vertical pressure tank, while 3 and 4 show pressure tanks arranged one on each side of the central tank. Last mentioned tank is, as will be seen, somewhat higher than the side tanks so that the upper part of the tank 2 can be serving as a common expansion space 5 for the three tanks. The tanks 2 and 3 are connected with each other by means of the pipe connection 6 and the tanks 2 and 4 by the pipe connection 7 between the upper parts of the tanks and also through the pipe connections 9, 10 and 11 which from a common distribution piece 12 are introduced through the upper parts of the tanks and downwards close to the bottom of the tanks.

Even if it is not absolutely necessary, it might during filling and emptying prove to be practical to have arranged valves 13, 14, 15, 16 and 17 in the connection pipes, between the separate tanks of the groups. Furthermore the tanks of the group will have to be provided with a common or three separate safety valves 18 depending upon whether valves are arranged in the connection pipes between the tanks or not.

19 is an inlet and outlet pipe for liquid with the valve 20, common for the group of tanks. In a corresponding way 21 is a common inlet and outlet pipe for gas with the valve 22.

As will be understood from Figure 1 a number of central tanks and side tanks is supposed to be arranged in three rows in the longitudinal direction of the ship, each group comprising one tank from each row, the three tanks in each group being connected with each other across the longitudinal direction of the ship.

When the tanks are to be filled, liquid or "liquified gas" is supplied through the pipe 19 and is distributed through the pipes 9, 10 and 11. As the level of the liquid in the tanks is rising, the counterpressure might, if necessary, be relieved by letting air and gas escape through the pipes 6, 7 and 21. Liquid is filled to a level in the central tank 2 above the top of the side tanks so that these are completely filled with liquid. If the temperature after the tanks have been filled is changing, the resulting changes of pressure and volume will be balanced between the tanks through the pipes 9, 10 and 11, respectively through 6 and 7 and by means of the common expansion space 5.

Valves 13, 14, 15, 16 and 17 in the connection pipes between the tanks should always be kept open when the tanks are filled with liquid. 23 is a manometer and 24 a liquid gauge glass.

Figure 2:
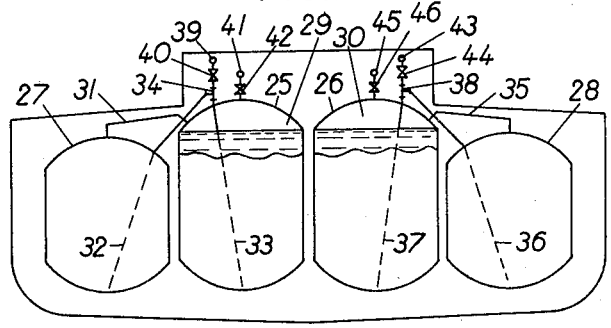
Figure 2 shows in a corresponding way a second embodiment.
Figure 3:
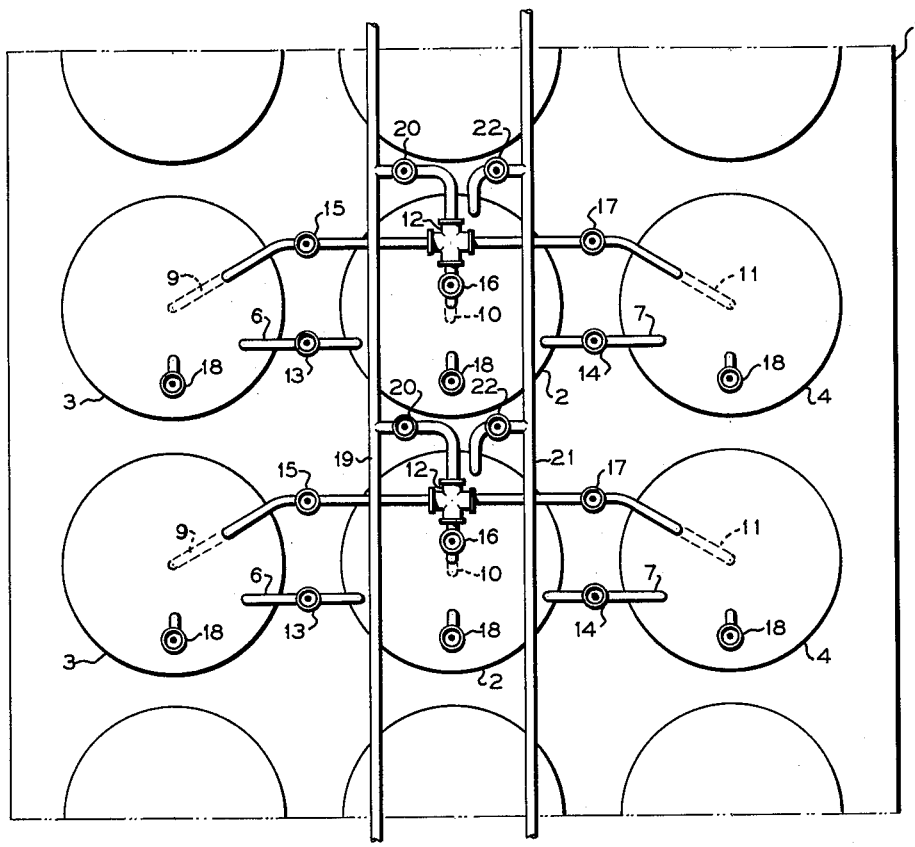
Figure 3 shows a plan view of the embodiment according to Figure 1.

Figure 2 shows an embodiment of the invention in which four parallel rows of tanks in the longitudinal direction of the ship are arranged. The central tanks 25 and 26 are made higher than the side tanks 27 and 28. The tanks 25 and 27 are connected at their upper parts through a connection pipe 31 and further through a pipe 32 and a pipe 33 extending close to the bottom of the tanks and being connected at 34 near the top of the tanks.

In a similar way the tanks 26 and 28 are connected at their upper parts through the pipe 35 and further through the pipe connections 36, 37 and 38. 39 is an inlet and outlet pipe for liquid common for the tanks 25 and 27, and 40 designates a valve.

41 is an inlet and outlet pipe for gas common to tanks 25 and 27 and 42 is a valve. In a similar way 45 is an inlet and outlet pipe for gas with valve 46 for the tanks 28 and 26, and 43 is an inlet and outlet pipe for liquid, with valve 44.

I claim:

1. A tanker equipped with vertical pressure tanks arranged in a plurality of rows in the longitudinal direction of the ship, said tanks being adapted to contain a liquid gas under superatmospheric pressure, connections at the top of said tanks interconnecting said tanks transversely of the ship to form interconnected groups of tanks, each group comprising one tank from each row, one of said tanks in each group extending above the other tanks in said group so that the uppermost part of the inner space thereof is situated at a higher level than the uppermost part of the inner space of any of the other tanks in such group and serving as a common expansion space for all tanks in the group, pipes passing through the upper parts of said tanks and extending downwardly close to the bottom of said tanks for connecting the lower parts of said tanks, a common means for loading said tanks in a group with liquid and discharging liquid from said tanks and a common means for loading of said tanks in a group with gas and discharging gas from said tanks.

2. A tanker as claimed in claim 1 in which all tanks consist of vertical pressure tanks arranged in three longitudinal rows, the tanks in the middle row extending to a higher level than the other tanks, each group of tanks including one tank in the middle row and adjacent tanks in the other rows.

References Cited in the file of this patent

UNITED STATES PATENTS

| 2,048,312 | Zulver | July 21, 1936 |
| 2,539,453 | Marlow et al. | Jan. 30, 1951 |

FOREIGN PATENTS

| 4,898 | Great Britain | Mar. 8, 1894 |
| 21,445 | Great Britain | Sept. 28, 1911 |
| 24,981 | Austria | July 25, 1906 |